United States Patent [19]
Schwanke et al.

[11] Patent Number: 5,461,698
[45] Date of Patent: Oct. 24, 1995

[54] METHOD FOR MODELLING SIMILARITY FUNCTION USING NEURAL NETWORK

[75] Inventors: Robert W. Schwanke, North Brunswick; Stephen J. Hanson, Princeton, both of N.J.

[73] Assignee: Siemens Corporate Research, Inc., Princeton, N.J.

[21] Appl. No.: 79,687

[22] Filed: Jun. 17, 1993

Related U.S. Application Data

[63] Continuation of Ser. No. 698,646, May 10, 1991, abandoned.

[51] Int. Cl.[6] .............................. G06F 15/80; G06K 9/62
[52] U.S. Cl. ................................ 395/22; 395/21; 395/23
[58] Field of Search ............................ 395/21, 22, 24, 395/23; 382/36

[56] References Cited

U.S. PATENT DOCUMENTS

| | | | |
|---|---|---|---|
| 4,319,221 | 3/1982 | Sakoe | 340/146.3 |
| 4,326,101 | 4/1982 | Sakoe | 179/1 SD |
| 4,467,437 | 8/1984 | Tsuruta et al. | 364/513.5 |
| 4,484,348 | 11/1984 | Shizuno | 382/48 |
| 4,528,688 | 7/1985 | Ichikawa et al. | 381/43 |
| 4,530,110 | 7/1985 | Nojiri et al. | 381/43 |
| 4,559,604 | 12/1985 | Ichikawa et al. | 364/513.5 |
| 4,624,011 | 11/1986 | Watanabe et al. | 381/43 |
| 4,651,289 | 3/1987 | Maeda et al. | 364/513.5 |
| 4,716,593 | 12/1987 | Hirai et al. | 381/42 |
| 4,723,290 | 2/1988 | Watanabe et al. | 381/43 |
| 4,731,845 | 3/1988 | Matsuki et al. | 381/43 |
| 4,745,562 | 5/1988 | Prazdny | 364/551 |
| 4,752,957 | 6/1988 | Maeda | 381/42 |
| 4,773,099 | 9/1988 | Bokser | 382/14 |
| 4,783,806 | 11/1988 | Nakamura et al. | 381/43 |
| 4,876,731 | 10/1989 | Loris et al. | 382/40 |
| 4,893,255 | 1/1990 | Tomlinson, Jr. | 364/513 |
| 4,897,811 | 1/1990 | Scofield | 364/900 |
| 5,109,431 | 4/1992 | Nishiya et al. | 382/30 |

FOREIGN PATENT DOCUMENTS

| | | |
|---|---|---|
| 0245508 | of 0000 | European Pat. Off. |
| 8810476 | of 0000 | WIPO |
| 8703399 | of 0000 | WIPO |

OTHER PUBLICATIONS

Lippmann, R. P., "An Introduction to Computing With Neural Nets", IEEE ASSP Mag., Apr. 1987, 4–22.
"Pattern Classification Using Trainable Logic Networks", Evans, IJCNN Int'l Joint Conference on Neural Networks, 19–22 Jun. 1989, Washington, US, pp. 429–433.

(List continued on next page.)

*Primary Examiner*—Robert W. Downs
*Attorney, Agent, or Firm*—Adel A. Ahmed

[57] ABSTRACT

Given a set of objects (A, B, C, ... ), each described by a set of attribute values, and given a classification of these objects into categories, a similarity function accounts well for this classification when only a small number of objects are not correctly classified. A method for modelling a similarity function using a neural network comprises the steps of: (a) inputting feature vectors to a raw input stage of a neural network respectively for object S in the given category, for other objects G in the same category being compared the object S, and for object B outside the given category; (b) coupling the raw inputs of feature vectors for S, G, and B to an input layer of the neural network performing respective set operations required for the similarity function so as to have a property of monotonicity; (c) coupling the input elements of the input layer to respective processing elements of an hidden layer of the neural network for computing similarity function results adaptively with different values of a coefficient w of the similarity function; (d) coupling the processing elements of the hidden layer to respective output elements of an output layer of the neural network for providing respective outputs of an error function measuring the extent to which object S is more similar to object G than to object B; and (e) obtaining an optimal coefficient w by back propagation through the neural network which minimizes the error outputs of the error function.

12 Claims, 4 Drawing Sheets

OTHER PUBLICATIONS

"Neuronale Netze als Signal—und Musterklassifikatoren", Barschdorff et al., Technisches Messen TM, vol. 57, No. 11, Nov. 1990, Munich, Germany, pp. 437–444.

"Empirically Guided Software Development Using Metric-Based Classification Trees", Porter et al., IEEE Software, Mar. 1990, pp. 46–54.

"Change Management for Very Large Software Systems", Maarek et al., Seventh Ann. Int'l Phoenix Conf. on Computers & Comm., Scottsdale, Ariz., Mar. 1988, pp. 280–285.

"Information Distribution Aspects of Design Methodology", Parnas, Information Processing 71, North–Holland Publishing Company (1972), pp. 339–344.

Paper entitled "On the Criteria To Be Used In Decomposing Systems Into Modules", by Parnas, (Aug. 1971).

Ada 9X Program Structure and Compilation Issues, Draft Mapping Document, 21 Feb. 1991, pp. 10-1—10-5.

"Software Change Dynamics or Half of all Ada Compilations are Redundant", Adams et al., Univ. of Karlsruhe, Karlsruhe, FRG, Jun. 8, 1989, pp. 1–15.

"System Structure Analysis: Clustering with Data Bindings", Hutchens et al., IEEE Transactions on Software Eng., vol. SE-11, No. 8, Aug. 1985, pp. 749–757.

"System Partitioning and Its Measure", Belady et al., The Journal of Systems & Software 2, 23–29 (1981), Elsevier North Holland, Inc., 1981, pp. 23–29.

"Features of Similarity", Tversky, Psychological Review, vol. 84, No. 4, Jul. 1977, pp. 327–351.

"A Parallel Network that Learns to Play Backgammon", Tesauro et al., Artificial Intelligence 39 (1989), pp. 357–390.

"Modularization and Hierarchy in a Family of Operating Systems", Habermann et al., Communications of the ACM, May 1976, vol. 19, No. 5, pp. 266–272.

"Version Management in Gypsy", Cohen et al., Proceedings of the ACM SIGSOFT/SIGPLAN . . . , Boston, Mass., Nov. 28–30, 1988, pp. 201–215.

"Error Localization During Software Maintenance: Generating Hierarchical System Descriptions from the Source Code Alone", Selby et al., Conference on Software Maintenance–1988, Phoenix, Ariz., Oct. 24–27, 1988, pp. 192–197.

"Extracting and Restructuring the Design of Large Systems", Choi et al., IEEE Software, Jan. 1990, pp. 66–71.

Article entitled "Tools for Software Configuration Management" by Tichy, Proc. Int'l Workshop on Software Conversion and Configuration Control (Jan. 1988), pp. 1–20.

"Configuration Management, The Notion and the Tools", Estublier, Proceedings of Jan. 27–29, 1988 Grassau, pp. 38–61.

"Program–Variations–in–the–Small", Winkler et al., Proceedings of the International Workshop on Software Version and Configuration Control, Jan. 27–29, 1988 Grassau, pp. 175–196.

"Learning Internal Representations by Error Propagation", Rumelhart, pp. 318–362; MIT Press, (1986).

"A Taxonomy of Some Principal Types of Data and of Multidimensional Methods for Their Analysis", Shepard, pp. 21–47, (1970).

"Programming–in–the Large Versus Programming–in–the–Small", DeRemer et al., IEEE Transactions on Software Engineering, vol. SE–2, No. 2, Jun. 1976, pp. 80–86.

"The C Information Abstraction System", Chen et al., IEEE Transactions on Software Engineering, vol. 16, No. 3, Mar. 1990, pp. 325–334.

"Configuration Management in BiiN™ SMS", Schwanke et al., ACM, (1989), pp. 383–393.

"A Method for Improving the Classification Speed of Clustering Algorithms Which Use a Euclidean Distance Metric", Curle et al., Proceedings of the IEEE, vol. 69, No. 1, Jan. 1981, pp. 128–129.

METHOD FOR MODELLING SIMILARITY FUNCTION USING NEURAL NETWORK

CROSS-REFERENCE TO RELATED APPLICATION

This is a continuation of Ser. No. 07/698,646 filed May 10, 1991, now abandoned.

This patent application is related to copending U.S. patent application Ser. No. 08/062,481 of Schwanke et al., entitled "Method For Software Structure Analysis Using Conceptual Clustering", filed on May 17, 1993, and to U.S. patent application Ser. No. 08/241,278 of the same inventors in the present invention, entitled "Method For Estimating Similarity Function Coefficients From Object Classification Data", filed on Nov. 16, 1994.

The following related patent applications are being filed on even date herewith in the name of Robert W. Schwanke, one of the present inventors. The disclosed subject matter thereof is herein incorporated by reference. The application entitled A FEATURE RATIO METHOD FOR COMPUTING SOFTWARE SIMILARITY discloses a method for computing the similarity between first and second software objects. The application entitled AN INTERACTIVE METHOD OF USING A GROUP SIMILARITY MEASURE FOR PROVIDING A DECISION ON WHICH GROUPS TO COMBINE discloses a method of using a group similarity measure, with an analyst, on a set containing a plurality of groups, the groups containing software objects, for providing a decision on which groups to combine. The application entitled A METHOD FOR COMPUTING THE SIMILARITY BETWEEN TWO GROUPS OF OBJECTS discloses a method for computing the similarity between two groups of objects wherein the similarity between any pair of objects can be computed by a similarity function, the method being for use in software clustering. The application entitled A TWO-NEIGHBORHOOD METHOD FOR COMPUTING THE SIMILARITY BETWEEN TWO GROUPS OF OBJECTS discloses another method for computing the similarity between two groups of objects wherein the similarity between any pair of objects can be computed by a similarity function, the method being for use in software clustering. The application entitled A METHOD FOR ADAPTING A SIMILARITY FUNCTION FOR IDENTIFYING MISCLASSIFIED SOFTWARE OBJECTS discloses a method for providing initial estimates for the weights and coefficients of a similarity function, using them to identify an initial maverick list, removing the mavericks from their assigned groups, and then outputing the modified groups, using only qualified data for tuning the similarity function. The application entitled A METHOD OF IDENTIFYING MISCLASSIFIED SOFTWARE OBJECTS discloses a method for identifying software objects that have been assigned to a wrong group, wherein the similarity between objects is known, such as by evaluating a similarity function.

FIELD OF INVENTION

The present invention relates to a method for evaluating the classification of objects into categories, and particularly, to one for estimating coefficients for a similarity function usable for classification. The method has particular application for automated analysis of the composition structure of a large software program.

BACKGROUND OF INVENTION

A composition structure for a large software program is an "organization chart" that groups procedures into modules, modules into subsystems, subsystems into bigger subsystems, and so on. The composition structure chart is used for project management, integration planning, design, impact analysis, and almost every other part of software development and maintenance. In a well-designed system, each module or subsystem contains a set of software units (procedures, data structures, types, modules, subsystems) that collectively serve a common purpose in the system. However, because the purposes and roles of software units frequently overlap, it is not always easy to decide how a system should be divided up. Furthermore, during the evolution of a large software system over several years, many software units are added, deleted, and changed. The resulting organization chart may no longer have any technical rationale behind it, but may instead be the result of economic expediency, or simple neglect. Its poor quality then increases the cost of software maintenance, by impeding technical analysis.

Generally, when a software system that has been developed by a large team of programmers has matured over several years, changes to the code may introduce unexpected interactions between diverse parts of the system. This can occur because the system has become too large for one person to fully understand, and the original design documentation has become obsolete as the system has evolved. Symptoms of structural problems include too many unnecessary recompilations, unintended cyclic dependency chains, and some types of difficulties with understanding, modifying, and testing the system. Most structural problems cannot be solved by making a few "small" changes, and most require the programmer to understand the overall pattern of interactions in order to solve the problem.

A field of application of the present invention is in the implementation of a software architect's "assistant" for a 0 software maintenance environment. The "assistant" is a computer program for helping the software architect to analyze the structure of the system, specify an architecture or chart for it, and determine whether the actual software is consistent with the specification. Since the system's structural architecture may never have been formally specified, it is also desirable to be able to "discover" the architecture by automatically analyzing the existing source code. It should also be possible to critique an architecture by comparing it to the existing code and suggesting changes that would produce a more modular specification.

A common approach to structural analysis is to treat cross-reference information as a graph in which software units appear as nodes and cross-references appear as edges. Various methods, both manual and automatic, may then be used to analyze the graph. Recent work has used clustering methods to summarize cross-reference graphs, by clustering nodes into groups, and then analyzing edges between groups. See, e.g., Yoelle S. Maarek and Gail E. Kaiser, "Change Management in Very Large Software Systems", Phoenix Conference on Computer Systems and Communications, IEEE, March 1988, pp. 280–285, and Richard W. Selby and Victor R. Basili, "Error Localization During Software Maintenance: Generating Hierarchical System Descriptions from the Source Code Alone", Conference on Software Maintenance—1988, IEEE, Oct. 1988. Other currently available methods for recovering, restructuring, or improving the composition structure chart are "manual", involving much reading and trial and error.

Clustering algorithms may be either batch or incremental. A batch algorithm looks at all of the data on all objects before beginning to cluster any of them. An incremental algorithm typically looks at one object at time, clustering it with the objects it has already looked at before looking at the next object. The heart of a batch algorithm is the similarity measure, which is a function that measures how "similar" two groups of objects are (each group can have one or more members). The batch algorithm takes a large set of individual objects and places them together in groups, by repeatedly finding the two most similar objects (or groups of objects) and putting them together. The batch algorithm typically produces groups with two subgroups. This is unnatural for most purposes; instead it is preferable to merge some sub-groups to make larger groups.

Prior art applications of clustering to software analysis have generally fallen into two categories. One category is conceptual clustering for re-use, as discussed in Maarek and Kaiser, referred to above. This work finds a way to specify the external interface of a software unit, including its function, and then classify units drawn from many different system to place them in a library where they can be found and re-used. They cannot use shared names for classification because two similar units drawn from different systems would use different names.

Another category is statistical clustering which attempts to predict errors and predict the impact of changes, as discussed in Selby and Basili, referred to above. This work classifies the software units according to the number of "connections" between them, which may be procedure calls, data flow paths, or names used in one group that are the names of units in the other group. The resulting groups can be used to plan integration sequences for large software systems, and can be measured to predict the likelihood of errors in them. However, the groups do not have lists of shared characteristics that would explain to the programmer why they were grouped together. There is no evidence yet that the groups computed this way would be appropriate for describing the structure of the whole system.

It is a therefore a general object of the present invention to automate the task of analyzing the composition structure of a large software program by using computerized clustering methods for grouping objects into groups according to similar attributes. It is a particular object of the invention to provide feedback on classification decisions that can lead to improved classification. Specifically, it is desired to provide a method for estimating the optimal coefficients for a similarity function which accounts well for the classification of objects in a category.

SUMMARY OF INVENTION

Conceptual clustering methods are applied to computerized software structure analysis. Objects are classified for inclusion in a group, module, or subsystem by measuring the extent to which its members use the same software units, i.e., clustering by NAMES-USED, and the extent to which the members of a subsystem are used together by other software units, i.e., clustering by USER-NAMES. The objects are described by a pair of measured attribute values for NAMES-USED and USER-NAMES.

In the present invention, it is recognized that providing feedback on classification decisions can lead to improved classification. Given a set of objects (A, B, C, . . . ), each described by a set of attribute-value pairs, and given a classification of these objects into categories, it is desireable to find a similarity function which accounts well for this classification. A similarity function is used to test the classification of an object S by computing the similarity SIM(S, N) of the object S to each other classified object N, and identifying the k most-similar objects. An object S is correctly classified when it is already in the same class as the majority of the k objects most similar to it. The similarity function accounts well for a classification when only a small number of objects are not correctly classified. This is obtained when coefficients are found for the similarity function which result in an error rate that is considered to be an acceptable level.

In accordance with the present invention, a method for modelling a similarity function using a neural network comprises the steps of:

(a) inputting feature vectors to a raw input stage of a neural network respectively for object S in a given category, for other object G in the same category being compared the object S, and for object B outside the given category;

(b) coupling the raw inputs of feature vectors for S, G, and B to a set of input elements in an input layer of the neural network for performing respective set operations required for the similarity function (SIM) providing a property of monotonicity;

(c) coupling the input elements of the input layer to respective processing elements of an hidden layer of the neural network for computing similarity function results adaptively with different values of coefficients w of the similarity function;

(d) coupling the processing elements of the hidden layer to respective output elements of an output layer of the neural network for providing respective outputs of an error function measuring the extent to which object S is more similar to object G than to object B; and (e) obtaining an optimal coefficient w by back propagation through the neural network which minimizes the error outputs of the error function.

The above-described estimation method finds the similarity function which is an approximation of an "ideal" similarity function for classifying objects in the given category. The optimal similarity function may be used in conjunction with clustering methods for object classification.

BRIEF DESCRIPTION OF DRAWINGS

The above objects and further features and advantages of the invention are described in detail below in conjunction with the drawings, of which.

DETAILED DESCRIPTION OF PREFERRED EMBODIMENTS

A conceptual cluster is a group of entities that have common properties which can describe a unifying concept. An initial step is to find the common properties of units of software, and then to use them to place the units in groups. These groups, and groups of groups, form the composition structure chart, which is termed a "classification tree" or "concept tree".

Conceptual clustering is a special case of statistical clustering. In the general case, any kind of information about objects can be used to cluster them, and there need not be any list of common properties. Conceptual clustering can be used when each individual object has similar characteristics or attributes, and the objects are grouped according to these attributes.

When the units of a subsystem share a common purpose, it is often reflected in a set of variables, procedures, and data types that they use. These may actually be hidden within the subsystem, where no other units may use them, or they may simply be used intensively within the subsystem, and only rarely outside it. One measure of the quality of a subsystem is the extent to which its members use the same software units. Another reflection of a common purpose is the extent to which the members of a subsystem are used together by other software units.

It is herein recognized that the names of (non-local) variables, procedures, macros, and types used by a software unit are important characteristics of the unit, and may be used effectively to cluster it, hereinafter referred to as the NAMES-USED. Furthermore, the names of other units, in which a given unit's name is used, may also be used effectively to cluster a unit and are hereinafter referred to as the USER-NAMES.

Thus, the NAMES-USED and USER-NAMES can be treated as "features" or "attributes" of the software unit. Doing so allows the use of similarity measures based on these shared features. While the literature relating to classification normally uses dissimilarity measures, the more intuitive term "similarity measure" is preferred herein. The use of similarity measures in turn allows the use of automated "conceptual clustering" methods, which were originally developed for classification, pattern recognition, information retrieval, and machine learning, and are applied herein to software analysis.

The application of clustering in the present invention differs considerably from prior art applications. In the present invention, a goal of conceptual clustering is to look for shared implementation concepts, as reflected in shared names. Prior systems, on the other hand, look either for similar specifications, as in software re-use libraries, or for operational subsystems, as in software error prediction metrics. In the present invention, similar units grouped together are all drawn from the same software system, whereas prior art clustering for re-use classifies units drawn from different systems. In statistical clustering applications, the similarity measures are designed in isolation, rather than being derived from a category utility measure. This means that the quality of the overall tree structure is not explicitly considered in the design of the similarity measure. In most published software clustering experiments, similarity has been based on the number of "connections" between software units. The connections may be names used, procedures called, data dependency paths, or other kinds of connections. The drawback of this approach is that two software units that are not connected to each other are unlikely to be placed in the same group, even if they perform similar functions for many of the same "clients" in the software system.

In the present invention, a similarity function based on the shared characteristics NAMES-USED and USER-NAMES, rather than on connections between the compared groups, is found to be more effective at discovering objects that are similar in design, especially when those objects have few direct connections between them. For example, the SINE and COSINE routines are common routines in a mathematical software library. One would not expect that either one of them will actually call, or pass data to, the other. On the other hand, one could expect that many of the software modules that call the SINE routine would also call the COSINE routine, and vice versa. This situation is portrayed in a hypothetical call graph shown in FIG. 1.

Figure 2:
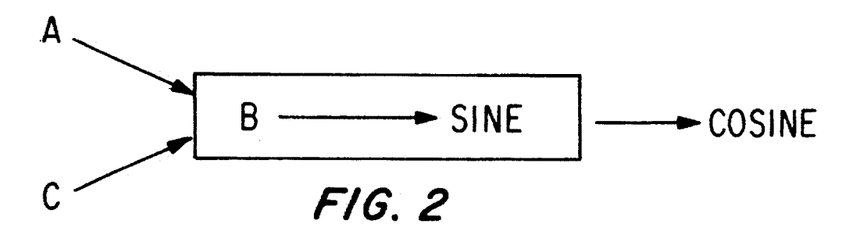

A similarity measure based on the prior art method of measuring connection strength might determine that SINE is more similar to A, B, or C than it is to COSINE. Clustering the two most similar nodes might produce the graph in FIG. 2, showing modulo permutations of (A, B, C) and (SINE, COSINE), which is not an acceptable result. Rather, what is required is a similarity measure that recognizes the parallel structure apparent in FIG. 2.

Figure 1:
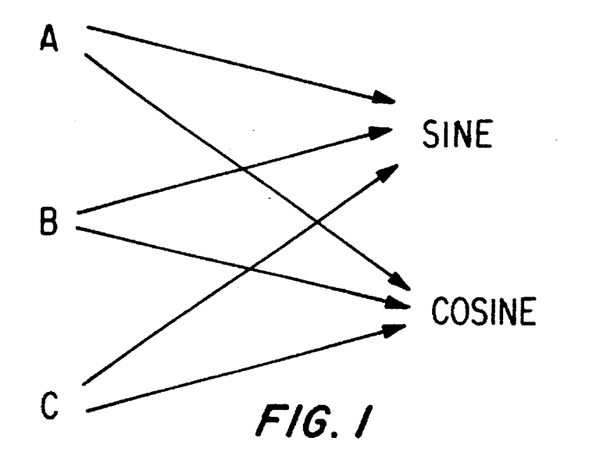
FIGS. 1, 2, and 3 are call graphs comparing the use of conceptual clustering methods to statistical clustering methods for the classification of objects in software analysis.
Figure 3:
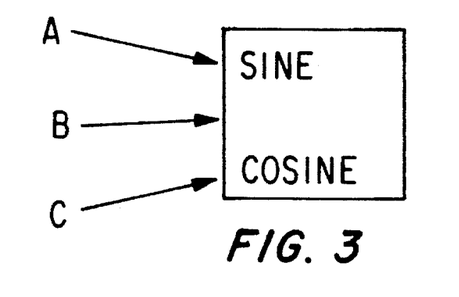

The similarity measures for NAMES-USED and USER-NAMES employed in the present conceptual clustering methods, i.e., those based on "shared names" do this very well. In FIG. 1, both SINE and COSINE share USER-NAMES A, B, and C. Conversely, A, B, and C all share the NAMES-USED SINE and COSINE. Clustering the two nodes that share the most common names produces the graph in FIG. 3 which represents the correct groupings.

Another clustering analysis method in the present invention represents edges in a graph as "features" of the nodes they connect, and measures similarity of nodes by looking at which features two nodes have in common, and which are different. In software engineering graphs, nodes (A, B, C, . . .) are represented by objects of the same names, and edges (X,Y) are represented by giving the object X a feature #Y, and giving the object Y a feature &X, where the name convention of &M and #M are used to represent an object's predecessors and successors in the graph, respectively. These graphs represent cross-reference information. The set of features (#M) of object X represent the non-local names that it uses (its NAMES-USED), and the set of features (&M) represent the names of other software units that use the name X (its USER-NAMES). In the previous example, the SINE and COSINE routines both have features (&A, &B, &C), and the routines A, B, and C have features (#SINE, #COSINE).

By representing the cross-references as features, we can easily identify names that are common to (shared by) two nodes by comparing their feature lists. Useful similarity measures can be defined by counting the number of shared names, non-shared names, or both. Aggregate measures can also be defined for measuring similarity between two groups of objects, by looking at the frequency with which common features occur in the groups. Shared-name similarity measures do not replace or subsume connection strength measures. If two nodes are connected, but have no shared names, the similarity between them will be zero. However, it is recognized that composite similarity measures based on both connection strength and shared names may be useful.

Even where it is not known exactly what information a name represents, seeing the same name occurring in two software units suggests that their implementations are related. This may be due to a shared variable, macro, type, or procedure. In each case, it means that they both rely on the functional specification of the shared name. If a group of software units share a set of data types, variables, macros, and/or procedures which few other units use, the group should be considered as a potential module.

Figure 4:
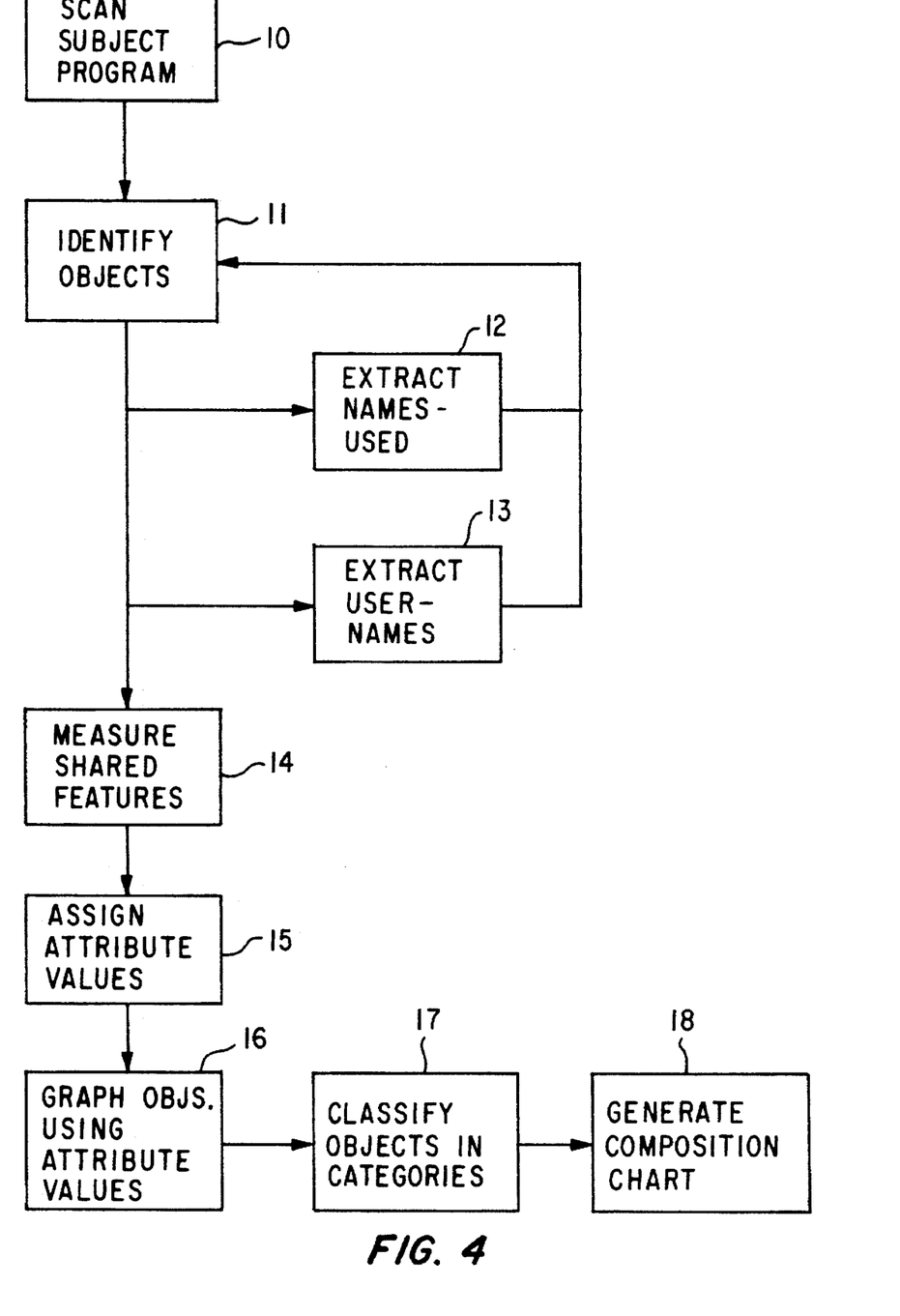
FIG. 4 is a block diagram of the steps in an automated software analysis program for classifying software objects into categories according to measured shared-name attribute values and generating a composition chart of the categorized objects.

In FIG. 4, a block diagram illustrates the basic steps in the application of conceptual clustering methods as applied to software analysis using the above-described attributes of NAMES-USED and USER-NAMES. In the first block 10, the source code of the subject software program is scanned using, for example, a text string search. Objects such as files, procedures, routines, modules, and/or subsystems are identified at block 11, and the names of routines called or referenced by the objects, i.e., NAMES-USED, as well as the names of routines calling or referencing the objects, are extracted at blocks 12 and 13. The shared features of the objects, i.e., shared NAMES-USED and USER-NAMES, are compared at block 14, and a pair of attribute values are assigned at block 15 based upon measures of the extent of shared names. At block 16, the objects are compared by graphing them using their attribute values for coordinates on the graph axes. At block 17, the objects are classified into categories, by human expertise through visual analysis of the graph, and/or by computing similarity measures using a similarity function for calculating their "closeness", e.g., Euclidean distance, to neighboring objects. The similarity function is described in greater detail below in conjunction with a coefficient estimation method of the present invention. When the objects have been classified into categories, a charting routine at block 17 is used to generate a tree composition chart using conceptual clustering algorithms.

In copending U.S. patent application Ser. No. 07/525,376 of Schwanke et al., entitled "Method For Software Structure Analysis Using Conceptual Clustering", filed on May 17, 1990, various conceptual clustering methods based upon shared-name features are disclosed. Hierarchical ascending classification (HAC) algorithms are described for forming clusters (classes) of objects in a bottom-up fashion, by forming small clusters of closely-related or very similar objects, then combining the small clusters into larger clusters, then finally forming a classification tree whose leaves are the original objects, and whose interior nodes are the classes. Contrarily, partitioning algorithms are used to divide a set of classes into two or more classes, then recursively divide each class. A "massage" recursive procedure is used to increase the average branching factor of a tree by eliminating low-utility interior nodes. Utility is measured by a category utility function CU(T) which is the product of the size and "purity" of a category. "Purity" is measured as the sum of squares of feature frequencies, i.e., of the probability that a member of a category has a given feature. Reference is made to the parent application for a more detailed description of these object classification methods.

The above-described software analysis techniques can be incorporated in a software architect assistant program. An aspect of the present invention relates to a graphical and textual "structure chart editor" for maintaining large software systems, hereinafter referred to as "ARCH". The ARCH program includes a feature extracting tool for extracting cross-reference features from existing source code, and an editor for browsing the cross-reference information, editing a subsystem composition tree (which may be initially input based upon an existing composition specification), automatically clustering procedures into modules and modules into subsystems, and identifying strong connections between procedures located in different modules.

In the present invention, it is recognized that providing feedback on classification decisions can lead to improved classification. Given a set of objects (A, B, C, . . . ), each described by a set of attribute-value pairs, and given a classification of these objects into categories, it is desireable to find a similarity function which accounts well for this classification. If a similarity function is found to work well, it can be relied upon for classifying or confirming the classification of an object in that category.

Figure 5:
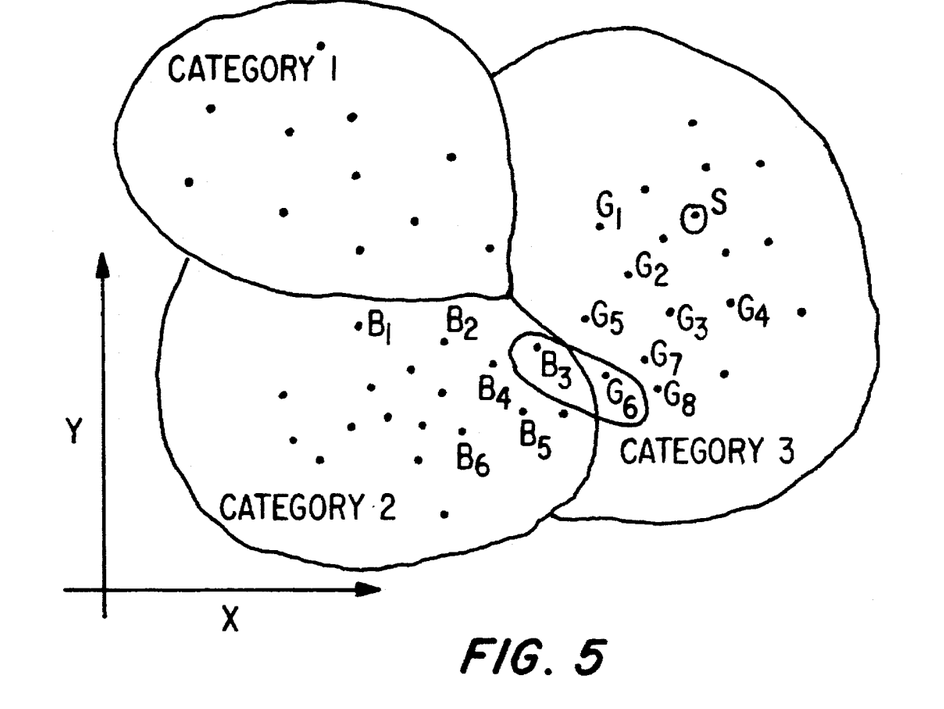
FIG. 5 is a schematic drawing showing illustrating the problem of deriving a similarity function which accounts well for a given object classification.

FIG. 5 illustrates this problem for a very simple case. Each point in the scattergram plots an observed object, as defined by a pair of real numbers, such as its measured attribute values. The objects have been classified into Category 1, Category 2, and Category 3 by an analyst or by an analysis program viewing the plotted data and identifying clusters.

A similarity function is used to classify an object S by computing the similarity $SIM_w(S,N)$ of the object S to each other classified object N, identifying the k most-similar objects, determining which category contains the majority of these objects, and placing S in the same class. If no class contains a majority, the object S cannot be classified. An object S is deemed correctly classified when it is already in the same class as the majority of the k objects most similar to it.

A similarity function accounts for a classification when there exists a value k such that each object S is correctly classified. A similarity function accounts well for a classification when only a small number of objects are not correctly classified. A similarity function is an approximation of an "ideal" similarity measure when coefficients w are estimated for the function which results in an error rate that is considered to be an acceptable level.

The present invention provides a method using a feed-forward, back propagation neural network for estimating the optimal coefficient for the similarity function to make it account well for a given set of objects and classification of those objects into categories. Each object is described by a tuple of values <c, v1 . . . vn>, where c is the object's assigned category, and v1 . . . vn are the values of n attributes selected to describe the object.

For example, the similarity function may be related to the Euclidean distance between objects described by a pair of attribute values, which are plotted as points on assumed X and Y axes. Such a function can be expressed as:

$$SIM_w(<x1,y1>,<x2,y2>)=1/[w*(x2-x1)^2+(y2-y1)^2]0.5$$

The coefficient w in the formula represents the relative scale of units along the X and Y axes. Varying this parameter will change not only the absolute distances, but also the rank order of distances between pairs of points. It is desireable to find the best value for w such that, in most cases, the similarity measure for a point indicates that it should be in the same category as the points nearest (most similar) to it. For example, the two points G6 and B3 (circled in the diagram) may be more similar to the majority of points in Categories 2 or 3, depending upon how the value of w of the similarity function stretches or contracts their relative distances along the X and Y axes.

A neural network performs a mapping from input data to output data through a hidden layer. Each layer is comprised of one or more processing elements which performs an I/O or given transfer function. A back propagation neural network is designed to "learn" or "adapt" to perform the mapping by being given modelling examples of expected inputs and outputs. A back propagation neural network algorithm is fully described in the reference text "Parallel Distributed Processing, The Microstructure of Cognition", Rumelhart, Hinton & Williams, MIT Press, 1986. In a typical back propagation system, there are directed connections from the processing elements in the input layer to the hidden layer, and from the hidden layer to the output layer. There are no connections between processing elements in the same layer, nor cross-connections from the output layer to the hidden layer or from the hidden layer to the input layer, i.e., there are no cycles (loops) in the connection arrangement.

Learning similarity function coefficients from a table of similarity value orderings is related to a general method called multidimensional scaling (MDS), which is well described in Multidimensional Scaling, by Shepard, Romney, and Nerlove, 1972. However, MDS generally requires that almost every entity be compared to almost every other entity, and that the similarities be rank-ordered. Learning an ordinal measure with a neural network, by measuring two quantities whose order is known and comparing the results, has been described by Tesauro in the context of the Neurogammon Program for evaluating backgammon game moves.

In the present invention, the "ideal" similarity functions are found by using a feed-forward, back propagation neural network to estimate the function weighting coefficients w. The basis of this method is a continuous approximation to the error function ERR, as follows:

$$ERR(SIM_w, <S, G_i, B_j>) = (\sigma(SIM_w(S,G_i) - SIM_w(S,B_j)) - threshold)^2,$$

where threshold is typically 0.95, and $$\sigma(x) = \frac{1}{1 + e^{-x}}$$

Thus, the error function is close to 0 when S is significantly more similar to G, the "good neighbor", than to B, the "bad neighbor", and close to $(0.95)^2$ when the opposite is true. The optimal coefficient estimation method tries to find a value for w that minimizes the number of times that $ERR(SIM_w,<S,G,B>)$ is significantly greater than 0.

The above-described error function has a continuous first derivative, making it suitable for solution by gradient descent. To explain how gradient descent works, an example is given for using it on a very simple similarity measure, i.e., the Inner Product measure routinely used in information retrieval. The Inner Product measure takes the inner product of two feature vectors, the result of which is $A \cap B$. Its value depends only on shared features, not on non-shared (distinctive) features. Let IP(A,B) be the inner product measure, which is computed by attaching a weight to each of the possible shared names, and then summing the weights associated with names common to A and B:

$$IP(A,B) = \sum_{n \in A \cap B} \omega_n$$

The optimal weights would then be "learned" by evaluating ERR(IP,<S,G,B>) for each data tuple, and using gradient descent to select weights that would reduce ERR. In particular, the update rule for computing a weight at iteration t+1 from its previous value at t is:

$$\omega_n(t+1) = \alpha \frac{\partial ERR}{\partial \omega_n} + \omega_n(t)$$

The gradient descent method repeatedly evaluates the error function on a data sample and updates the weights, by the above rule, until the average error over all data items is minimized. However, the Inner Product measure is not accurate enough a measure for modelling the desired similarity functions, and therefore, the more complex functions described below are the ones preferred for modelling.

An accurate estimation of similarity function coefficients is obtained by using monotonic similarity functions. A general description of monotonic similarity functions is provided in "Features of Similarity" by Amos Tversky, in Psychology Review, vol. 84, no. 4, July 1977. Let all attributes of objects A, B, C . . . be boolean, meaning that each attribute can only have the value true of false. Each object can then be represented equivalently as a set of true attributes. Let a, b, c . . . be the sets of attribute names for which objects A, B, C . . . , respectively, have true values. The similarity function $SIM_w$ is monotonic if:

$$SIM_w(A,B) > SIM_w(A,C)$$

whenever the following set relationships hold:
  $a \cap b \supseteq a \cap c$,
  $a-c \supseteq a-b$, and
  $c-a \supseteq b-a$, where "$\cap$" represents a set intersection, "$\cup$" represents a set union, "$-$" represents set subtraction (the set of values that are in set-a but not in set-b), "$\supseteq$" represents "includes", i.e., set-a includes set-b or set-b is a subset of set-a, and "$\supset$" represents "proper inclusion", i.e., set-a has at least one element that set-b does not. Furthermore, the above inequality is strict whenever at least one of the set inclusions is proper.

When the similarity function SIM has the monotonicity property, the coefficient estimation method can use monotonic exclusion to exclude unwanted data from the training set. That is, object S is considered monotonically more similar to B than to G when attribute sets s, b, and g satisfy the inclusion conditions of the monotonicity property such that S will always be measured by the similarity function as more similar to B than to G regardless of the values of the coefficient w.

A special variation of the monotonic-exclusion method provides for restricting the class of similarity functions to those functions related to the Tversky Model of human similarity judgment, which are of the form:

$$SIM(A,B) = S(A \cap B, A-B, B-A)$$

Such functions embody the matching property. To ensure monotonicity, the following two functional forms CONTRAST or RATIO may be used:

$$S(x,y,z) = contrast(x,y,z) = f(x) - \omega_1 f(y) - \omega_2 f(z)$$

$$S(x,y,z) = ratio(x,y,z) = \frac{f(x)}{f(x) + \omega_1 f(y) + \omega_2 f(z)}$$

If the underlying function f is monotonic by set inclusion, i.e., if $x \supseteq y$ implies $f(x) < f(y)$, then both the CONTRAST and RATIO functions will be monotonic, matching similarity functions.

A further modification uses a similarity function that takes into account whether or not the compared objects are "linked". Linked(A,B) is a function whose value is 0 or 1 for every pair of inputs, and whose value is known for every pair of objects in the original classification. Intuitively, two objects are more similar if they are linked than if they are not. This modification can be adapted for monotonic functions by including the definition of monotonicity to add the condition Linked(A,B) or $\neg$Linked(A,C). It can also be adapted to ratio similarity functions by redefining:

$$\text{Ratio}Sim(S,N) = R(W(S \cap n), W(s-n), W(n-s), \text{linked}(S,N))$$

$$R(x,y,z,l) = \text{ratio}(x,y,z,l) = \frac{x + c \times l}{n + x + d \times (y+z)}$$

for $c > 0$

The linear definition for W works equally well on this modification as on the original method. All of the methods described above can be applied to analyzing software systems by treating modules as object classes, declaration units in modules as objects, deriving features from cross-references, and defining the link function Linked(A,B)=1, if object A refers to object B, or if object B refers to object A, and Linked(A,B)=0 otherwise.

A general example is now described for similarity function modelling using a neural network with one hidden layer. The network accepts N inputs at each processing element, computes K intermediate results in the hidden layer, and produces O outputs. Specifically, the inputs would be in the form of a sequence ($i_n$) of ones and zeroes representing the features of object A and object B. If there are N possible features, then the neural network computes the function SimNN as follows:

$$\text{SimNN}(A,B) = \sum_{k=1}^{K} \omega_{2,k} \sigma \left( \theta_k + \sum_{n=1}^{2N} \omega_{1,k,n} i_n \right)$$

The advantage of using the neural network with a hidden layer is that the K intermediate sums can account for correlated features, whereas functions which are linear combinations of their inputs do not account for correlations.

Combining SIMNN with the ERR function defined above produces the following result:

$$\text{ERR}(\text{SIMNN},<S,G,B>) = (\sigma(\text{SIMNN}(S,G) - \text{SIMNN}(S,B)) - \text{threshold})^2$$

Figure 6:
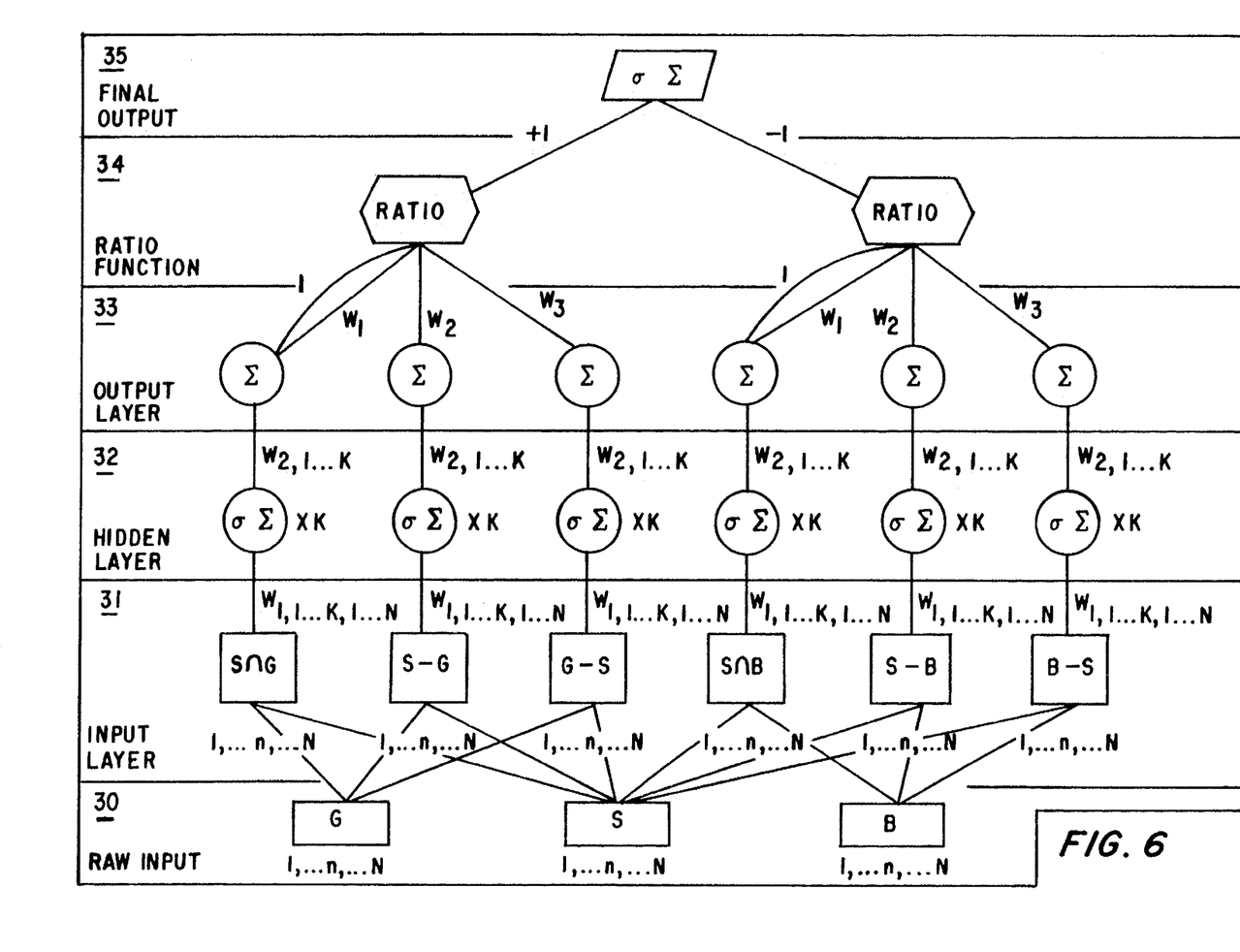
FIG. 6 is a schematic diagram of the application of a neural network for estimating the coefficients for the similarity function through feed-forward, back propagation.

In FIG. 6, a neural network arrangement is shown for the implementation of back propagation modelling of the monotonic similarity functions. The network has a raw input layer 30 of the data tuples <S,G,B> of the training set, these three feature sets are input. Each feature set may be represented as a vector of numbers, each number representing either the presence or the absence of that feature in the set. All N elements of each vector are connected to the relevant set operation boxes in the next layer with no weights attached to the links, a network input layer 31 consisting of processing elements which perform the respective input set functions shown, each square box specifies a set operation, which is implemented for a pair of feature vectors. The output of each square box is a feature vector containing N elements. Each of the N elements of each output feature vector are linked to each of K copies of the circular node directly above it, with a link weight of $w_{l,n,k}$. These link weights are the same for the output of each set operation box, a hidden layer 32 which performs the K intermediate sums adaptively to the coefficient weights w, contains the operator "sigma SUM", which represents applying the sigmoid function to the sum of the inputs of the node. The outputs of layer 32 are single numbers. All K copies of a node in layer 32 transmit their outputs to the same node directly above them in layer 33. Each connection link has a different weight, $w_{2,k}$. Again, the same weights are used at all six links in this portion of the network, and a network output layer 33 for summing error function values sums the inputs of the nodes and transmits the result to the next layer. A further layer 34 implements the matching, monotonic function RATIO for each partial error function output two links are used from the first node in layer 33 because that value is used twice in the RATIO function, once with a coefficient of "1" and once with a coefficient of "w1". In this layer each link weight appears twice, once in the left half and once in the right half. The final layer 35 computes the difference (comparison) value. Layer 35 is connected to layer 34 by links with weights of positive or negative "1". Summing these two inputs is equivalent to computing the difference of two values of the RATIO function. Applying the sigmoid function to this difference results in the error function. Estimation of the optimal values of w is obtained by back propagation through the neural network to minimize the average value of the error function ERR over the similarity measures data of the training set. Note, for weights that appear more than once in the network, during backpropagation the error term assigned to a weight is the sum of the error terms assigned to it for each of the links to which it is attached. This follows directly from the mathematical definition of backpropagation.

The specific embodiments of the invention described herein are intended to be illustrative only, and many other variations and modifications may be made thereto in accordance with the principles of the invention. All such embodiments and variations and modifications thereof are considered to be within the scope of the invention, as defined in the following claims.

What is claimed is:

1. A computer-implemented method utilizing a neural network having a raw input layer, for fitting a model of similarity to a set of similarity judgments familiar to a human user for application in software tools for assisting said human user in performing tasks requiring similarity judgments, whereby said tasks may include any of classification and clustering, comprising the steps of:

(a) inputting a set of judgments, one at a time, into said raw input layer of said neural network, wherein each of set of judgments comprises a triple of objects <S,G,B>, where S is more similar to G than S is to B, and with each respective object being represented by a vector of features present in each said respective object;

(b) coupling outputs of said raw input layer of said neural network to respective inputs of an input layer of a duplicated neural network where said duplicated neural network comprises two identical copies of a simpler network, with first and second sets of link weights being used for respective ones of said two identical copies, said first and second sets of link weights being identical, and with input couplings so arranged that one of said identical copies computes the similarity of S to B, and the other of said identical copies computes the similarity of S to G, said simpler network comprising a desired functional form of said model of similarity;

(c) coupling an output layer of said duplicated neural network to a final output node which computes a result indicative of the difference between two similarity values previously computed by said two identical copies, applies an activation function to said result, and compares a resulting value to a predetermined threshold to derive an error value; and (d) deriving optimal link weights for said model of similarity by backpropagating said error value through said neural network.

2. A computer-implemented method in accordance with claim 1, wherein said tasks requiring similarity judgments comprise tasks requiring similarity judgments of software units.

3. A computer-implemented method in accordance with claim 2, wherein said desired functional form of said model of similarity comprises a monotonic form.

4. A computer-implemented method in accordance with claim 2, wherein said desired functional form of said model of similarity comprises a monotonic and matching form.

5. A computer-implemented method in accordance with claim 2, wherein said desired functional form of said model of similarity comprises a form wherein a hidden layer of said neural network computes set union, intersection, and difference.

6. A computer-implemented method in accordance with claim 2, wherein said desired functional form of said model of similarity comprises a form wherein a hidden layer of said neural network uses linked copies of a feature weight aggregation function to compute the significance of said each set of judgments.

7. A computer-implemented method in accordance with claim 1, wherein the error value, ERR, is:

$$ERR\ (SIM_w, <S, G_i, B_j>) = (\sigma(SIM_w(S,G_i) - SIM_w(S, B_j)) - \text{threshold})^2$$

where $SIM_w$, a similarity function, is said desired functional form of said model of similarity using the coefficients w, and the threshold is typically 0.95, and $$\sigma(x) = 1/(1+e^{-x}).$$

8. A computer-implemented method in accordance with claim 7, wherein said desired functional form of said model of similarity is monotonic, all attributes of objects A, B, C are treated as boolean, each object is represented equivalently as a set of true attributes, sets a, b, c are the sets of attributes for objects A, B, C, respectively, that have true values, and $SIM_w$ is monotonic if:

$$SIM_w(A, B) > SIM_w(A, C)$$

whenever the following set relationships hold:

$a \cap b \supseteq a \cap c$, $a - c \supseteq a - b$, and $c - a \supseteq b - a$ where "$\cap$" represents a set intersection, "$\cup$" represents a set union, "$-$" represents set substraction (the set of values that are in set-a but not in set-b, "$\supseteq$" represents "includes", i.e., set-a includes set-b or set-b is a subset of set-a and "$\supset$" represents "proper inclusion", i.e., set-a has at least one element that set-b does not.

9. A computer-implemented method in accordance with claim 8, wherein said desired functional form of said model of similarity is restricted to those functions defined in the Tversky Model of human similarity judgement.

10. A computer-implemented method in accordance with claim 9, wherein the following further functional form of the similarity function, $SIM_w$, is used:

$$SIM_w(A,B) = S(A \cap B, A-B, B-A),$$

where $S(x,y,z) = \text{contrast}(x,y,z) = f(x) - w_1 f(y) - w_2 f(z)$ where x, y, z are variables, f() is a monotonic function, and $w_1$ and $w_2$ are representations of weighting.

11. A computer-implemented method in accordance with claim 9, wherein the following further functional form of said similarity function, $SIM_w$, is used:

$$SIM_w(A,B) = S(A \cap B, A-B, B-A),$$

where $S(x,y,z) = \text{ratio}\ (x,y,z) = f(x)/(f(x) + w_1 f(y) + w_2 f(z))$ where x, y, z are variables, f() is a monotonic function, and $w_1$ and $w_2$ are representations of weighting.

12. A computer-implemented method in accordance with claim 8, wherein Linked (A, B) is a function whose value is 0 or 1 for every pair of inputs, and whose value is known for every pair of objects in the original classification, and the restriction of the similarity function to monotonic functions includes in a definition of monotonicity the condition Linked (A, B) V– Linked (A, C).

* * * * *